(12) United States Patent
Blacker et al.

(10) Patent No.: US 10,101,515 B2
(45) Date of Patent: Oct. 16, 2018

(54) WIRE GRID POLARIZER AND METHOD OF MANUFACTURE

(71) Applicant: Vision Ease, LP, Ramsey, MN (US)

(72) Inventors: Richard Blacker, Lino Lakes, MN (US); David Olund, Stanchfield, MN (US)

(73) Assignee: Vision Ease, LP, Ramsey, MN (US)

( * ) Notice: Subject to any disclaimer, the term of this patent is extended or adjusted under 35 U.S.C. 154(b) by 131 days.

(21) Appl. No.: 14/616,578

(22) Filed: Feb. 6, 2015

(65) Prior Publication Data

US 2015/0219813 A1    Aug. 6, 2015

Related U.S. Application Data

(60) Provisional application No. 61/936,831, filed on Feb. 6, 2014.

(51) Int. Cl.
*G02B 5/30* (2006.01)
*G02C 7/12* (2006.01)
*B29D 11/00* (2006.01)

(52) U.S. Cl.
CPC ...... *G02B 5/3058* (2013.01); *B29D 11/00644* (2013.01); *G02C 7/12* (2013.01); *G02C 2202/16* (2013.01)

(58) Field of Classification Search
CPC .................................. G02C 7/12; G02B 5/204
USPC ............ 359/485.06, 487.03; 351/49, 159.27, 351/159.56
See application file for complete search history.

(56) References Cited

U.S. PATENT DOCUMENTS

| | | | |
|---|---|---|---|
| 7,227,684 B2* | 6/2007 | Wang | B82Y 20/00 359/485.03 |
| 7,768,018 B2 | 8/2010 | Smirnov et al. | |
| 7,771,045 B2 | 8/2010 | Matera et al. | |
| 7,894,019 B2 | 2/2011 | Yamaki et al. | |
| 8,027,086 B2 | 9/2011 | Guo et al. | |
| 8,133,428 B2 | 3/2012 | Kaida et al. | |
| 8,205,551 B2 | 6/2012 | Begon et al. | |
| 8,471,984 B2* | 6/2013 | Kumai | G02B 5/3058 349/5 |
| 8,685,862 B2 | 4/2014 | Goto et al. | |
| 8,703,618 B2 | 4/2014 | Goto et al. | |
| 8,709,317 B2 | 4/2014 | Kaida et al. | |
| 8,716,140 B2 | 5/2014 | Goto et al. | |
| 8,730,575 B2 | 5/2014 | Kaida et al. | |
| 2006/0262398 A1 | 11/2006 | Sangu et al. | |
| 2007/0087549 A1 | 4/2007 | Yamaki et al. | |
| 2007/0217008 A1* | 9/2007 | Wang | G02B 5/1809 359/485.05 |
| 2007/0252293 A1 | 11/2007 | Sato et al. | |
| 2008/0037101 A1* | 2/2008 | Jagannathan | G02B 5/1809 359/286 |

(Continued)

OTHER PUBLICATIONS

WIPO, U.S. International Search Authority, International Search Report and Written Opinion dated Apr. 21, 2015 in International Patent Application No. PCT/US2015/014920, 8 pages.

*Primary Examiner* — Bumsuk Won
*Assistant Examiner* — Jeffrey Madonna
(74) *Attorney, Agent, or Firm* — Inskeep IP Group, Inc.

(57) ABSTRACT

A polarizing optical article formed by selectively applying a conductive coating to a portion of a structured surface formed of a series of linear peaks and valleys.

18 Claims, 5 Drawing Sheets

(56) References Cited

U.S. PATENT DOCUMENTS

| | | | |
|---|---|---|---|
| 2008/0186576 A1* | 8/2008 | Takada | G02B 5/3025 359/487.03 |
| 2010/0103517 A1* | 4/2010 | Davis | C23C 14/04 359/485.05 |
| 2010/0182692 A1* | 7/2010 | Kenmochi | G02B 5/1861 359/485.05 |
| 2010/0283957 A1* | 11/2010 | Matera | B29D 11/00634 351/49 |
| 2011/0084424 A1 | 4/2011 | Kaida et al. | |
| 2012/0168065 A1 | 7/2012 | Kaida et al. | |

* cited by examiner

WIRE GRID POLARIZER AND METHOD OF MANUFACTURE

RELATED APPLICATIONS

This application claims priority to U.S. Provisional Application Ser. No. 61/936,831 filed Feb. 6, 2014, entitled Wire Grid Polarizer and Method of Manufacture, which is hereby incorporated herein by reference in its entirety.

FIELD OF THE INVENTION

The present invention is directed to devices and methods of manufacturing devices for polarizing light and, more particularly, devices employing wire grid polarizers.

BACKGROUND OF THE INVENTION

Polarizing functionality for optical lenses is required to be transmissive by virtue of the application and is typically provided by use of a stretched polyester or polyvinyl alcohol, PVA, film that is subsequently imbibed with a conductive material such as iodine or suitable organic dye. Such stretched film polarizing sheets can have up to 99.9 percent polarizing efficiency. However, at such high levels of efficiency, the optical transmission is typically reduced to a level close to 20 percent. The application space of ophthalmic lenses requires that the polarizing film material is entrained within the lens package itself.

An alternative technology to stretched film is wire grid polarizers, WGP. Wire grid polarizers have typically only been used for relatively long wavelength applications such as microwave, infrared, IR, and longer wavelengths because the wires available for employing in the polarizers have been too large to be effective to polarize the shorter wavelengths, such as wavelengths within the visible spectrum, e.g. approximates 390 to 700 nanometers. In order to enable visible light polarization, the spacing of wires in a wire grid polarizers needs to be below the wavelength of visible light, and preferably significantly below the lowest wavelength, for example 200 nanometers.

Hence, there exist a need in the field for wire grid polarizers that are operable to efficiently polarize the relatively shorter wavelengths in the visible light spectrum.

OBJECTS AND SUMMARY OF THE INVENTION

The present invention provides wire grid polarizers that are operable to efficiently polarize the relatively shorter wavelengths in the visible light spectrum. These objectives are achieved, in part, by providing a lens having a first and second surface through which a lens user looks, a substantially uniform linear series of peaks and valleys formed on one of said first and second surfaces, and a conductive coating applied to less than an entirety of the series of peaks and valleys so as to form a series of conductive wires across said one of said first and second surfaces of said lens. In certain embodiments, a substantially uniform linear series of peaks and valleys is molded into one of said first and second surfaces. In certain embodiments, the conductive coating is applied to only a portion of a tip of the peaks of the substantially uniform linear series of peaks and valleys.

The present invention also provides methods for making wire grid polarizers that are operable to efficiently polarize relatively shorter wavelengths in the visible light spectrum. The method includes, in part, the steps of forming a linear structured surface on an optical article and coating less than an entirety of the linear structured surface with a conductive coating so as to form substantially distinct individual wires on the optical article.

Alternatively, methods according to the present invention include, in part, forming a linear pattern of peaks and valleys on a surface of an ophthalmic article and coating the surface of the ophthalmic article with a conductive coating from an angle relative to a best fit line through the surface of the ophthalmic article that is greater than zero and less than 90 degrees; and forming a plurality of conductive wires across at least a portion of the surface of the ophthalmic article through said coating.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Broadly speaking, the present invention achieves the formation of wire grid polarizers that polarize electromagnetic radiation in a range of wavelengths that is within the visible spectrum, e.g. approximately 390 to 700 nanometers. This objective is achieved by first forming a structured surface on an ophthalmic or optical article, such as a lens, a film, or a film laminate. The structured surface may employ a system of linear patterns or features, such as peaks and valleys, ranging in the scale of nanometers to hundreds of nanometers.

While an optical article employing such a structured surface shows a moderate level of visible light polarization, polarization increases greatly by selectively coating the structured surface with a conductive coating. The structured surface is selectively coated with a conductive layer such that the structured surface of the optical article allows for only certain portions of the structured surface of the article, for example a portion of a side of the peaks or a portion of the tip of the peaks, to receive the coating. The selectively coated portions of the structured surface thereby form a series of linear wires on the surface of the optical article that function as a wire grid polarizer.

In certain embodiments of the present invention, the surface upon which the inventive wire grid polarizer is formed is a front or back surface of an unfinished, single or multifocal optical lens puck or a front or back surface of a finished, single or multifocal optical lens.

In certain embodiments of the present invention, the desired surface structure is formed on the optical article during the casting or injection molding process. For example, a mold, such as a metal mold, employed during the lens formation process may have the desired structure formed on a surface upon which or against which the optical article will be formed. The surface structure may be formed on the mold by, for example, machining the mold with a diamond machining tip. By employing a relatively coarse diamond tip, for example a tip with a radius of curvature of 5 micrometers and a 35 degree tip angle, a structure having a distance between the peaks of linear features or cuts, i.e. a pitch, in the range of micrometers, for example 3 micrometers, can be formed. By employing a relatively fine diamond tip, for example a tip with a radius of curvature of 1 micrometer and a 25 degree tip angle, a pitch in the range of hundreds of nanometers can be formed. According to certain embodiments of the present invention surface structure in the range of 150 to 1000 nanometers is achieved, preferably in the range of 150 to 700 nanometers is achieved, and more preferably in the range of 150 to 200 nanometers is achieved. Such machined optical molds may be referred to as directly tuned metal optical components.

When an optical article is formed in a mold cavity having a surface structure such as described above, the lens substrate, for example a polycarbonate resin, conforms to the structured surface of the mold. Hence, when the optical article is removed from the mold, the surface of the optical article that was formed upon the structured surface of the mold will have a surface structure substantially identical to the surface structure of the mold cavity or to a reciprocal structure of the surface structure of the mold cavity.

For example, a molded polycarbonate lens fabricated at a molding temperature in the range of 250 to 350 degrees Celsius, for example 295 degrees Celsius, in a metal mold having a linear patterned surface structure will surprisingly have a structured surface with a high degree of fidelity with the structured surface of the mold in which it was formed.

Figure 1:
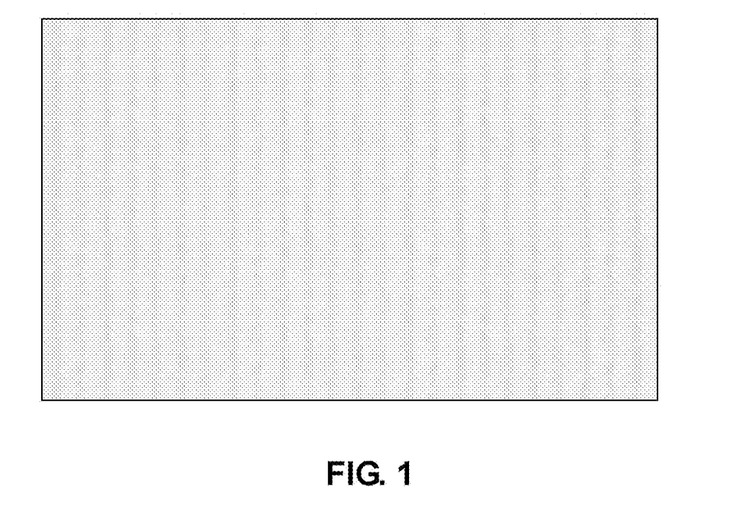
FIG. 1 is a micrograph of a surface structure of an ophthalmic article according to certain embodiments of the present invention.
Figure 2:
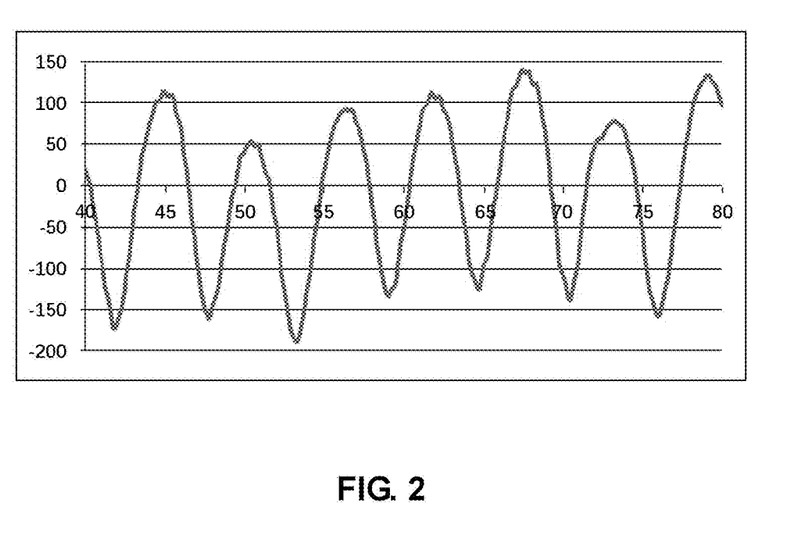
FIG. 2 is a cross-section of a surface structure of an ophthalmic article according to certain embodiments of the present invention.

FIG. 1 is an image of a micrograph of a portion of an optical article molded in a metal mold cavity having a linear patterned surface structure. The linear pattern of the surface structure of the mold was formed with a pitch of approximately 6 micrometers. As shown in FIG. 1, the surface of the optical article formed against the structured surface of this mold also has a linear patterned surface structure. FIG. 2 is a surface profile of a portion of the same structured surface of the optical article that was formed against the structured surface of this structured surface mold.

In certain embodiments of the present invention, the desired surface structure is formed directly into a front or back surface of a finished lens, non-finished lens, or blank lens puck. For example, the above disclosed diamond cutting technique may be employed for the direct surfacing or structuring of a surface of a formed lens or puck, e.g. a polycarbonate lens or puck.

Figure 3A:
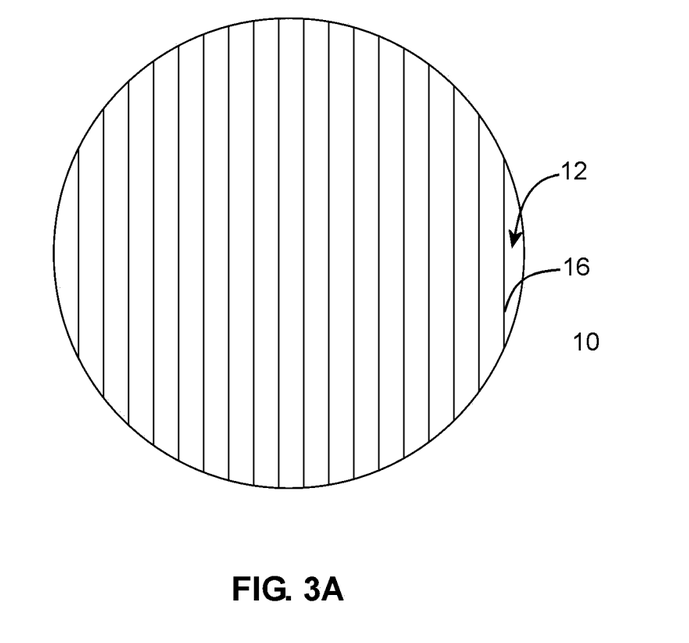
FIG. 3A is a plan view of an ophthalmic article according to certain embodiments of the present invention.
Figure 3B:
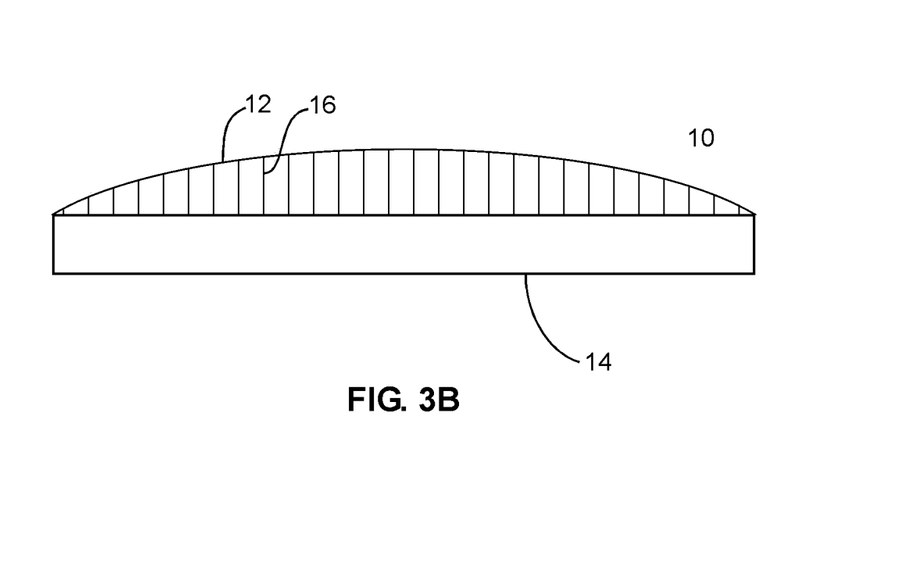
FIG. 3B is an elevation view of an ophthalmic article according to certain embodiments of the present invention.

FIGS. 3A and 3B are plan and elevation views, respectively, of a finished or semi-finished lens 10, according to certain embodiments of the present invention, having a front side 12 and a back side 14. The lens 10 employs a surface structure 16 on the front surface 12 that was formed either during the lens molding process or as a result of direct surfacing of the front side 12. For the sake of clarity, the linear features of the surface structure 16 are shown as if magnified and are not shown to scale relative to the actual dimensions of the lens.

Figure 4:
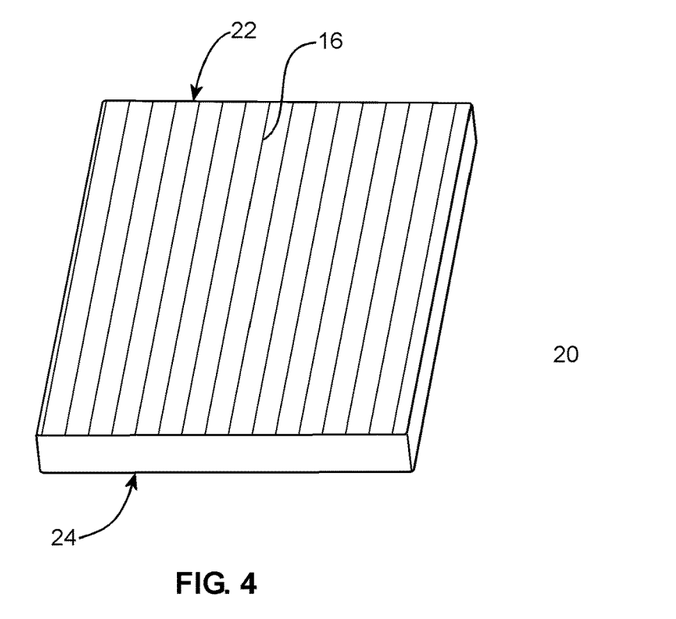
FIG. 4 is a perspective view of an ophthalmic article according to certain embodiments of the present invention.

In certain embodiments of the present invention, the desired surface structure is formed on a surface of a thin film or a thin film laminate, for example a functional laminate such as a photochromic laminate. The structured surface may, for example, be formed on the film or film laminate by ruling or other suitable techniques. The surface structured film or film laminate can then be employed alone to form a polarizing optical article having the inventive wire grid polarizer or can be molded through injection molding or casting to form laminate lenses, for example a single or multifocal ophthalmic lens. FIG. 4 shows a film 20 according to certain embodiments of the present invention, having a front side 22 and a back side 24. The film 20 employs a surface structure 16 on the front surface 22 that was formed either during formation of the film 20 or as a result of direct surfacing of the film 20. For the sake of clarity, the linear features of the surface structure 16 are shown as if magnified and are not shown to scale relative to the actual dimensions of the lens.

Figure 5:
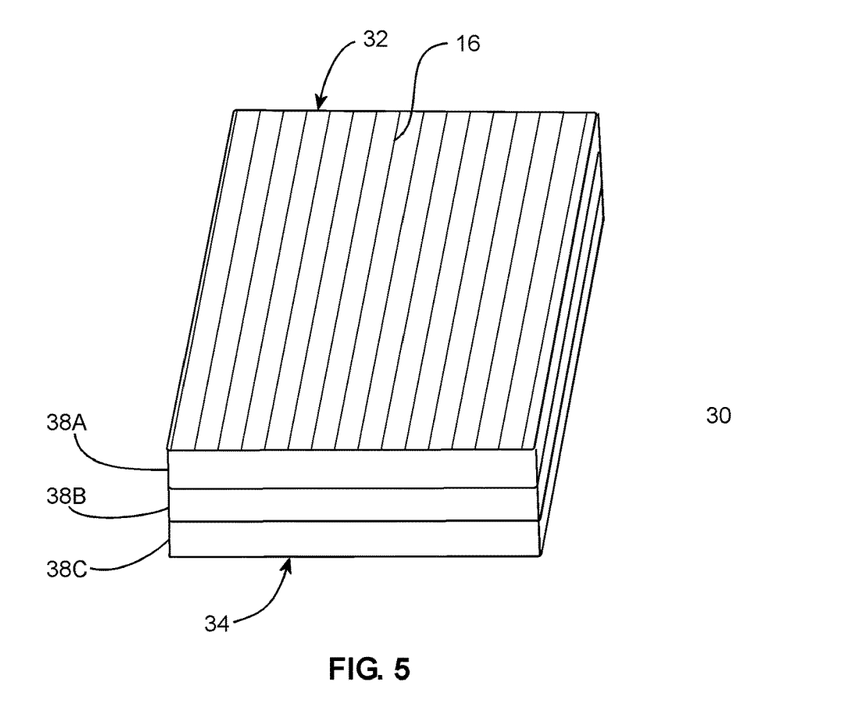
FIG. 5 is a perspective view of an ophthalmic article according to certain embodiments of the present invention.

FIG. 5 shows a film laminate 30 according to certain embodiments of the present invention, having a front side 32 and a back side 34 and laminated layers 38A, 38B, and 38C. The film laminate 30 employs a surface structure 16 on the front surface 32 that was formed either during formation of the laminate layer 38A; as a result of direct surfacing of the laminate layer 38A, prior to formation of the film laminate 30; or as a result of the direct surfacing of the front side 32 of film laminate, after formation of film laminate 30, i.e. as a result of direct surfacing of the front side 32 after the formation process of the laminate 30 (e.g. surfacing or patterning the front side 32 in the form of a polycarbonate sheet). For the sake of clarity, the linear features of the surface structure 16 are shown as if magnified and are not shown to scale relative to the actual dimensions of the lens.

Figure 6:
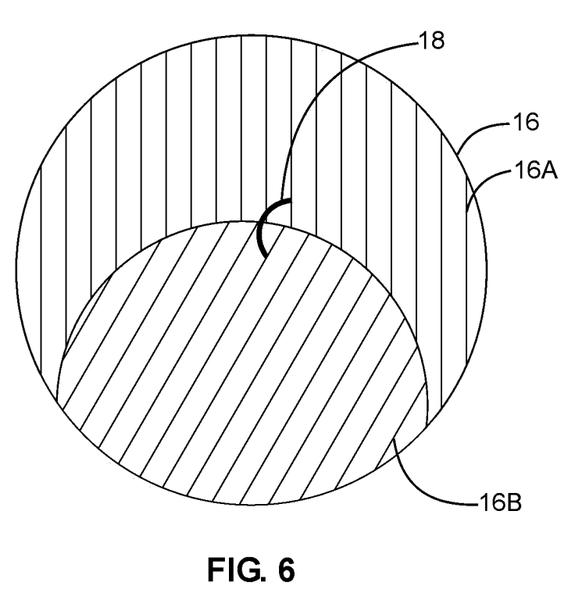
FIG. 6 is a plan view of a surface structure of an ophthalmic article according to certain embodiments of the present invention.

In certain embodiments of the present invention, the structured surface that will ultimately be employed to form the inventive wire grid polarizer, employs a structured pattern that, once selectively coated as described below, will have different regions that polarize light in different orientations. For example, as shown in FIG. 6, the surface structure 16 may employ linear structure in a first region 16A and linear structure in a second region 16B that is oriented at a non-zero degree angle 18 relative to the linear structure in the first region 16A.

Figure 7:
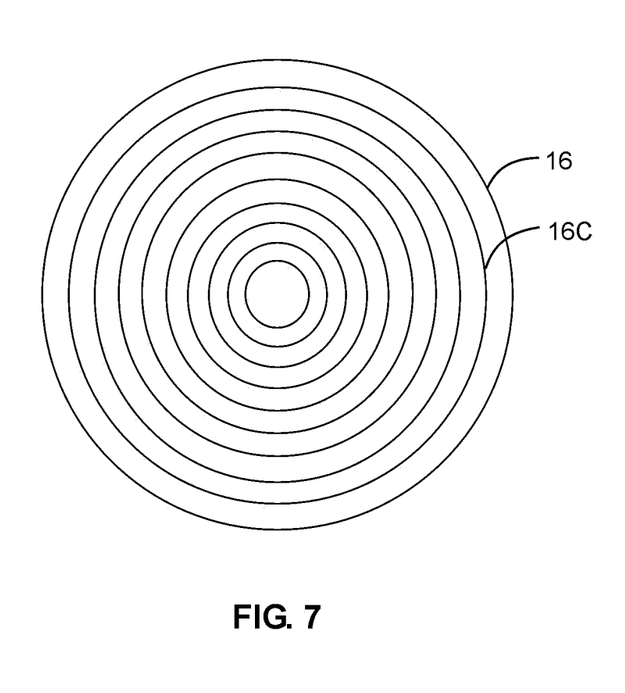
FIG. 7 is a plan view of a surface structure of an ophthalmic article according to certain embodiments of the present invention.

With reference to FIG. 7, in certain embodiments of the present invention, the structured surface that will ultimately be employed to form the inventive wire grid polarizer, employs a linear structured pattern of concentric circles 16C.

The polarization of the optical article employing such a surface structure will have some directionality associated with it depending on which direction the wearer is looking through the optical article. For example, if the concentric circles are centered on a pupil of a user, looking straight ahead will have an averaged polarization state of substantially zero, looking up or down will be polarized substantially horizontally, and looking left or right will be polarized substantially vertically.

In certain embodiments of the present invention, the same or different surface structure patterns may be combined in a single, contiguous region or may be employed in separate discontinuous structured regions on the surface of the optical article. Stated alternatively, in optical article employing multiple polarizing regions according to the present invention, the different regions may be formed in disperse regions of the article and need not contact or abut one another.

In order to from the "wires" of the inventive wire grid polarizer, the structured surface is selectively coated with a conductive layer or coating. The conductive coating may be applied or coated by, for example, employing spray or sputter coating/deposition techniques, e.g. physical vapor deposition.

The term "selective" is intended to mean that the final result of the coating process results in only certain portions of the structured surface being coated. For example, only portions of the sides of the peaks or tips of the peaks of the structured surface will ultimately be coated with the conducting layer. In effect, the selective coating process forms a series of distinct or discrete wires at a spatial frequency, pitch, or separation in the order of nanometers that is effective at polarizing wavelengths in the visible light spectrum.

In certain embodiments of the present invention, the wires thus formed are distinct or discrete wires or substantially distinct or discrete wires. Alternatively stated, due to the imperfections in, for example, the structuring process and/or the conductive coating process, the conductive wires formed may contact one or more adjacent wires on occasion. Hence, the term "substantially distinct" is intended to mean the majority of the linear dimension of the wires formed are independent of one another.

Figure 8:
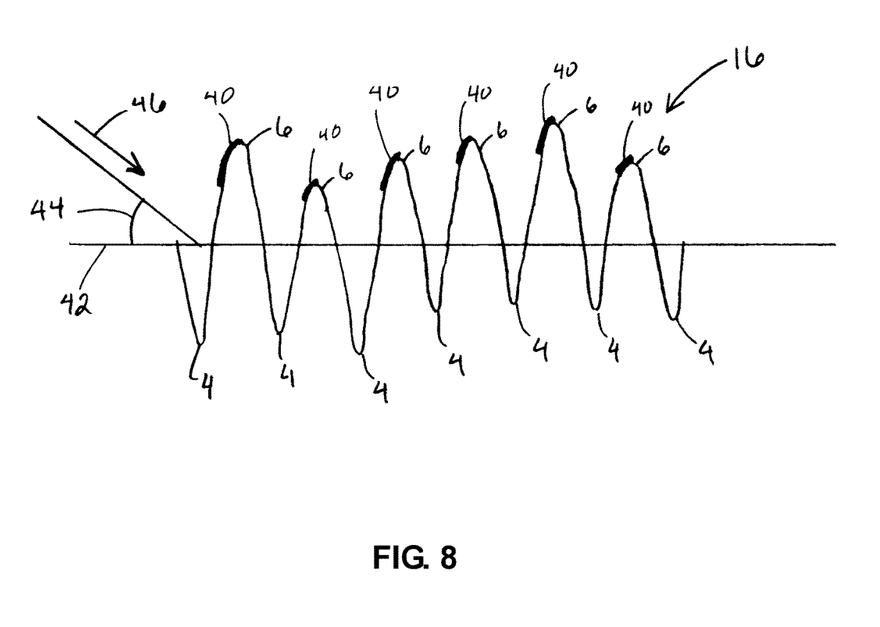
FIG. 8 is a cross-sectional view of a surface structure of an ophthalmic article according to certain embodiments of the present invention.

In certain embodiments, as shown in FIG. 8, selective coating or metallization is achieved by spraying or applying coating 40 to a portion of a peak 6 of structured surface 16. The selective coating is achieved, for example, by applying the coating from a direction, indicated by arrow 46, which forms an angle 44 that is non-zero degree and less than 90 degrees to a best fit line or plane 42 of the structured surface 16. Application of the coating 40 from direction 46 results in only a portion of the surface structure 16 being coated, because the undulating topography of the surface structure 16 blocks or shadows portions of the surface structure 16 from the direct line of sight or coating of direction 46. Due to the linear nature of the surface structure 16, the coating or coated areas 40 continue substantially the entire length of the linear structure 16, thereby forming substantially continuous conductive wires on the surface structure 16.

In certain embodiments of the present invention, once the lens has been formed with a structured or patterned surface mold and the wires generated, additional coatings, for example hard coatings and/or anti-reflective coatings, can be applied to the structured surface so as to embed the wire grid polarizer and provide physical and environmental protection for the polarizer.

In certain embodiments of the present invention, the reflectivity, transmission, and polarizing efficiency of the wire grid polarizer according to the present invention can be tuned or optimized by manipulating the pitch of the peaks of the structured surface and the angle 44 employed to selectively form the coating 40.

In certain embodiments of the present invention, the inventive wire grid polarizer forms a graded polarizer across a portion or all of an optical article, film, or film laminate. For example, from the perspective of a user, from a top to a bottom of an optical article the inventive wire grid polarizer may vary such that the upper portion of the lens has a higher polarizing efficiency than a lower portion of the optical article. This embodiment may be advantageous, for example, when a user is driving a vehicle. While viewing at a distance through the upper portion of the optical article there is a high degree of polarization. However, when viewing closer objects, for example digital readouts or LCD screens within the cockpit of the vehicle, through the lower portion of the optical article, there is little or no polarization that interferes with the viewing of such devices.

In certain embodiments of the present invention, the conducting coating employed to form the wire grid polarizer is a reflective metal-type coating. For example, the reflective conductor layer or coating may employ conductive metals such as gold, aluminum, copper, niobium, chromium, tin, or similar metals. The conductive, reflective layer may form part of a multilayer structure or a more complex coating such as an enhanced mirror or a low-e coating, for example a coating in which silver is buried in the middle of many other layers that serve to protect the metal and also provide aesthetic features. In certain embodiments, an anti-reflective coating is applied over the conductive, reflective coating so as to decrease or eliminate the reflective nature of the conductive, reflective coating.

In certain embodiments of the present invention, the conducting coating employed to form the inventive wire grid polarizer is a non-reflective conductor layer. For example, the non-reflective conductor layer may employ a metal-containing suboxide, multilayer stacks of metal-containing suboxides, or metal layers embedded within oxide or sub oxide layer stacks. The non-reflective conductive coating can be, for example, in the form of a low-e coating in which a metal suboxide such as chrome suboxide or nickel chrome suboxide is employed. The non-reflective conductive coating may be embedded in non-reflective or absorptive outer layers to enhance the non-reflective characteristics. Alternatively, such non-reflective or absorptive outer layers may be oriented below, on top or both on top and below of the non-reflective conductive layer to yield different visual cosmetic effects.

In certain embodiments of the present invention, the conducting coating employed to form the inventive wire grid polarizer is a transparent conductive layer. For example, the transparent conductor layer or coating may employ a transparent conductive coating or TCC. For example the transparent conductive coating may employ indium tin oxide or ITO, zinc aluminum oxide, or a carbon-based conductor such as graphene. Such transparent conductive layer allows for the formation of a relatively high transmission polarizing optical articles. In certain embodiments, a transparent conductive oxide is combined with other dielectric layers which will enable optical effects such as mirroring, anti-reflecting, and/or filtering, to be achieved in combination with the polarizing effect In certain embodiments in which a film or film laminate employing the inventive wire grid polarizer is in turn employed to form an optical article or laminate optical article such as a lens, from example through injection molding or casting, the wires formed on the film or film laminate will, but need not necessarily be, molded or cast internal of the optical article. Alternatively stated, with reference to FIGS. 4 and 5, during the injection molding or casting process, the lens substrate will be molded or case directly against the surface 22 or the surface 32. In certain embodiments in which injection molding is employed, the actual surface structure of the surface 22 or the surface 32 may be flattened or otherwise lessened during the molding process.

In one embodiment of the present invention the wire grid polarizer is formed by first coating an optical article, film, or film laminate with a conductive coating and then forming the wires of the wire grid polarizer by removal of linear portions of the conductive coating by, for example direct surfacing of the conductive coated surface of the optical article, film, or film laminate. In this embodiment, the method for producing the inventive wire grid polarizer is essentially the opposite of the method described above, i.e. the conductive coating is applied to the substrate prior to the surface structuring of the substrate. In certain situations, this embodiment may be advantageous in that the wires fabricated by the conductive coating are not subject to the above described selective, directional coating. Accordingly, non-linear or divergent polarizers may more easily be fabricated.

Wire grid polarizers according to the present invention achieve a much greater polarization efficiency than the current dye and stretched film technologies used in ophthalmic lenses today. The current technologies have a limit of approximately 80 percent polarizing efficiency at approximately 50 percent transmission and a limit of approximately 96 percent polarizing efficiency at approximately 40 percent transmission. At 98 percent polarizing efficiency, currently used technologies are limited to approximately 15 percent transmission. The wire grid polarizers according to the present invention advantageously and surprisingly improve upon the polarizing efficiency and transmission of current polarizing technologies. For example, wire grid polarizers according to the present invention achieve polarizing efficiencies of greater than 99 percent at approximately 50 percent light transmission.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for forming a polarizer comprising:
   imparting a linear structure of peaks and valleys on a surface of a first portion of a polymeric optical article during molding of the polymeric optical article;
   imparting a linear structure of peaks and valleys on a surface of a second portion of the polymeric optical article during molding of the polymeric optical article that is different from the linear structure of peaks and valleys on the surface of the first portion of the polymeric optical article; and
   forming substantially distinct individual wires on the surface of the polymeric optical article by applying a conductive coating directly on to less than an entirety of the peaks of the linear structure of peaks and valleys of the first portion of the polymeric optical article and the second portion of the polymeric optical article;
   providing the first portion of the polymeric optical article and the second portion of the polymeric optical article with different polarizing efficiencies relative to one another through said forming substantially distinct individual wires.

2. The method of claim 1 wherein imparting the linear structure of peaks and valleys on the surface of the first portion of the polymeric optical article comprises forming the linear structure on a front surface of the polymeric optical article.

3. The method of claim 1 wherein imparting the linear structure of peaks and valleys on the surface of the first portion of the polymeric optical article comprises imparting the linear structure during cast molding of the optical article.

4. The method of claim 1 wherein imparting the linear structure of peaks and valleys on the surface of the first portion of the polymeric optical article comprises forming a finished single vision optical lens.

5. The method of claim 1 wherein imparting the linear structure of peaks and valleys on the surface of the first portion of the polymeric optical article comprises molding the polymeric optical article with a film insert upon which the linear structure is formed.

6. The method of claim 1 wherein imparting the linear structure of peaks and valleys on the surface of the first portion of the polymeric optical article comprises imparting the linear structure during injection molding of the optical article.

7. The method of claim 1 wherein imparting the linear structure of peaks and valleys on the surface of the first portion of the polymeric optical article comprises imparting a series of peaks and valleys having a pitch in a range of 150 to 300 nanometers on the optical article.

8. The method of claim 1 wherein forming substantially distinct individual wires on the surface of the polymeric optical article comprises applying the conductive coating directly on to only a portion of a side of the peaks of the linear structure.

9. The method of claim 1 wherein forming substantially distinct individual wires on the surface of the polymeric optical article comprises applying the conductive coating from an angle relative to a best fit line through the surface of the optical article that is greater than zero and less than 90 degrees.

10. The method of claim 1 wherein forming substantially distinct individual wires on the surface of the polymeric optical article comprises applying a reflective conductive coating.

11. The method of claim 1 wherein forming substantially distinct individual wires on the surface of the polymeric optical article comprises applying a non-reflective conductive coating.

12. The method of claim 1 wherein forming substantially distinct individual wires on the surface of the polymeric optical article comprises applying a transparent conductive coating.

13. A method for forming a polarized ophthalmic article comprising:
   forming a linear pattern of peaks and valleys on a surface of a first portion of a thin film;
   forming a linear pattern of peaks and valleys on a surface of a second portion of the thin film;
   applying a conductive coating directly on to a portion of the peaks of the linear pattern of peaks and valleys of the first portion and the second portion of the thin film;
   forming a plurality of conductive wires across at least a portion of the peaks of the linear pattern of peaks and valleys of the first portion and the second portion of the thin film through said applying such that a polarizing efficiency of the first portion is different from a polarizing efficiency of the second portion; and incorporating the thin film into an ophthalmic article during molding of the ophthalmic article.

14. The method of claim 13 wherein incorporating the thin film into an ophthalmic article during molding of the ophthalmic article comprises incorporating the thin film into an ophthalmic article during injection molding of the ophthalmic article.

15. The method of claim 13 wherein incorporating the thin film into an ophthalmic article during molding of the ophthalmic article comprises incorporating the thin film into an ophthalmic article during cast molding of the ophthalmic article.

16. A molded polarized ophthalmic lens comprising:
a polymeric lens having a convex optical surface, a concave optical surface, a first portion, and a second portion through which a lens user looks;
a substantially uniform linear series of peaks and valleys formed within the first portion of the polymeric lens;
a substantially uniform linear series of peaks and valleys formed within the second portion of the polymeric lens; and
a conductive coating applied directly on to less than an entirety of the peaks of the series of peaks and valleys of the first portion of the polymeric lens and the second portion of the polymeric lens so as to form conductive wires;
a polarizing efficiency of the first portion of the polymeric lens different from a polarizing efficiency of the second portion of the polymeric lens.

17. The lens of claim 16 wherein the substantially uniform linear series of peaks and valleys of the first portion of the polymeric lens and the second portion of the polymeric lens are formed on a surface of a thin film that is molded to the lens.

18. The lens of claim 16 wherein the conductive coating is applied to only a portion of a side of a peak of the substantially uniform linear series of peaks and valleys of the first portion of the polymeric lens and the second portion of the polymeric lens.

* * * * *